G. B. NUSSBAUM.
TROLLEY.
APPLICATION FILED DEC. 1, 1920.

1,378,554.

Patented May 17, 1921.

G. B. Nussbaum,
Inventor.

UNITED STATES PATENT OFFICE.

GEORGE B. NUSSBAUM, OF NEW PHILADELPHIA, OHIO.

TROLLEY.

1,378,554.   Specification of Letters Patent.   Patented May 17, 1921.

Application filed December 1, 1920. Serial No. 427,532.

*To all whom it may concern:*

Be it known that I, GEORGE B. NUSSBAUM, a citizen of the United States, residing at New Philadelphia, in the county of Tuscarawas and State of Ohio, have invented a new and useful Trolley, of which the following is a specification.

This invention relates to trolleys and is designed more especially as an improvement upon Patent No. 849,262, issued to me on April 2, 1907.

One of the objects of the invention is to provide a trolley wheel so mounted relative to the harp that it will follow curvatures in the wire and will always automatically adjust itself to normal position.

A further object is to provide a trolley having a guard of novel form for preventing cross or stay wires from entering between the wheel and harp should the trolley jump from the trolley wire.

Another object is to provide a trolley having a signal lamp connected thereto.

With the foregoing and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawing the preferred form of the invention has been shown.

In said drawings—

Figure 1:
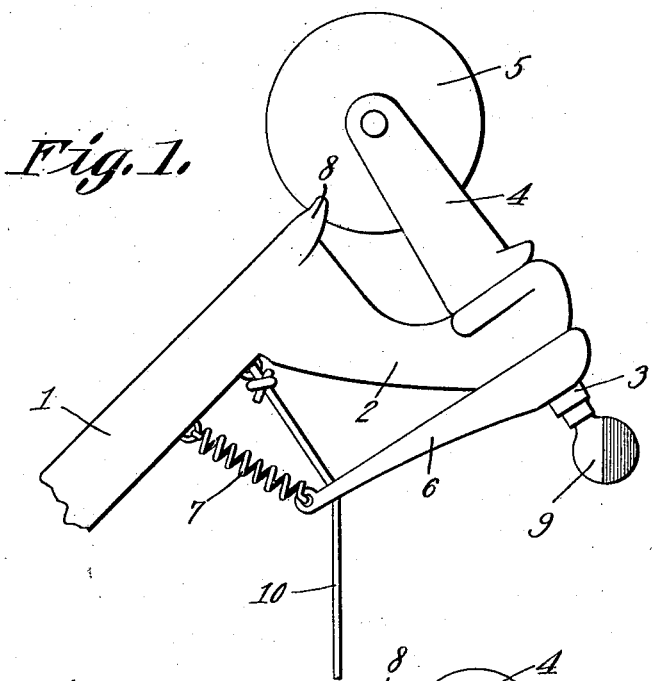
Figure 1 is a side elevation of the trolley.
Figure 2:
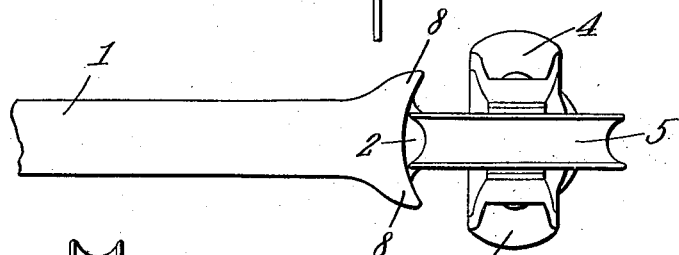
Fig. 2 is a plan view thereof.
Figure 3:
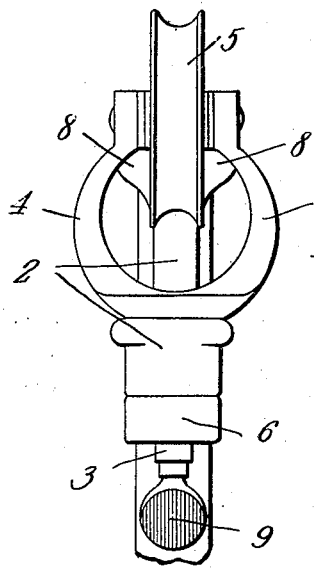
Fig. 3 is a front elevation.

Referring to the figures by characters of reference 1 designates the pole of the trolley, the same being provided at its upper end with a rearwardly and upwardly curved arm 2 providing a bearing for the stem 3 of a yoke or harp 4. A trolley wheel of ordinary construction is journaled in this harp, as indicated at 5. An arm 6 is secured to the stem 3 and extends downwardly, the free end of this arm being connected by a spring 7 to the pole 1 so that the spring tends to hold the arm normally extended downwardly with the wheel 5 in proper position.

Arranged at the upper end of the pole at its point of junction with the arm 2 are oppositely extending upwardly curved horns or guard fingers 8 concentric with the axis of rotation of the harp 4 and extending close to the periphery of the wheel 5. Thus, when viewed in side elevation, the horns extend upwardly past the margin of the wheel 5 and, obviously should the forwardly moving trolley jump from the trolley wire, these horns or fingers 8 will prevent the cross or stay wire from passing between the wheel 5 and the arm 2. As the horns 8 are arranged concentric with the axis of rotation of the harp 4, it will be noted that they operate just as efficiently no matter to what position the harp 4 may be rotated. Should the harp be turned out of normal position, the spring 7 will tend to restore it to normal position as will be obvious.

A signal lamp 9 is mounted upon the lower end of the chamber 3, the rear half of this lamp being preferably red while the front half is preferably white. Thus the lamp will serve as a danger signal to a car approaching it from the rear. The usual trolley rope, indicated at 10, is connected to the upper end of the pole 1 for the purpose of manipulating it.

What is claimed is:—

1. In a trolley the combination with a pole and an arm extending from the end thereof and offset relative thereto, of a harp mounted to rotate on and supported by the arm, a trolley wheel journaled within the harp, oppositely extending guard fingers upon the pole and concentric with the axis of rotation of the harp, the ends of the fingers normally extending past the periphery of the wheel, an arm mounted to swing with the harp, means for holding the harp and wheel in a predetermined position relative to the pole.

2. The combination with a pole and an arm offset from one end thereof, of a harp journaled within the arm, a trolley wheel carried by the harp, oppositely extending arcuate guard fingers upon the upper end of the pole and concentric with the axis of rotation of the harp, the ends of the fingers normally lapping the sides of the wheel, a yieldingly held arm mounted for movement with the harp, and a signal lamp connected to and movable with the harp.

3. In a trolley the combination with a pole of a harp mounted to rotate on and supported by the arm, a trolley wheel journaled within the harp, and oppositely extending guard fingers upon the pole and concentric with the axis of rotation of the harp, the ends of the fingers normally extending past the periphery of the wheel.

In witness that I claim the foregoing as my own, I have hereto affixed my signature in the presence of two witnesses.

GEORGE B. NUSSBAUM.

Witnesses:
S. W. SEIDNER,
JOSEPH W. RIEKER.